(12) United States Patent
Park et al.

(10) Patent No.: US 11,079,484 B2
(45) Date of Patent: Aug. 3, 2021

(54) COMMUNICATION DEVICE AND A METHOD FOR LOCALIZATION

(71) Applicant: Apple Inc., Cupertino, CA (US)

(72) Inventors: Mi Sun Park, San Jose, CA (US); Lei Yang, Hillsboro, OR (US); Scott Thomas, Gilbert, AZ (US); Jung Woo, Hillsboro, OR (US); Addicam Sanjay, Gilbert, AZ (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 16/304,148

(22) PCT Filed: Jun. 22, 2016

(86) PCT No.: PCT/US2016/038593
§ 371 (c)(1),
(2) Date: Nov. 22, 2018

(87) PCT Pub. No.: WO2017/222510
PCT Pub. Date: Dec. 28, 2017

(65) Prior Publication Data
US 2019/0346554 A1 Nov. 14, 2019

(51) Int. Cl.
*G01S 13/84* (2006.01)
*H04W 4/80* (2018.01)
(Continued)

(52) U.S. Cl.
CPC .......... *G01S 13/84* (2013.01); *G06K 7/10366* (2013.01); *G06K 19/0723* (2013.01);
(Continued)

(58) Field of Classification Search
CPC ...................................................... G01S 13/84
See application file for complete search history.

(56) References Cited

U.S. PATENT DOCUMENTS

2005/0237953 A1* 10/2005 Carrender ............... G01S 13/84
370/278
2011/0187600 A1 8/2011 Landt
(Continued)

FOREIGN PATENT DOCUMENTS

JP          2007292744 A     11/2007

OTHER PUBLICATIONS

International Search Report based on application No. PCT/US2016/038593 dated Jan. 16, 2017 (4 pages) (Reference Purpose Only).
(Continued)

*Primary Examiner* — Marcus E Windrich
(74) *Attorney, Agent, or Firm* — Kowert, Hood, Munyon, Rankin & Goetzel, P.C.

(57) ABSTRACT

A method for localizing a device. The method is performed by a communication device. The method includes measuring a phase of a signal that the communication device has received from the device, the signal having a first frequency; measuring a phase of at least one further signal that the communication device has received from the device; the at least one further signal having a second frequency, determining a phase pattern of a measured phase versus frequency, pattern matching the phase pattern with each reference phase pattern of a plurality of pre-determined reference phase patterns. Each reference phase pattern is associated with a distance between the communication device and the further communication device. The method further includes determining the distance between the further communication device and the communication device based on the pattern matching.

25 Claims, 7 Drawing Sheets

(51) Int. Cl.
  *G06K 7/10* (2006.01)
  *G06K 19/07* (2006.01)
  *H04B 1/7156* (2011.01)
  *H04W 4/02* (2018.01)
(52) U.S. Cl.
  CPC .......... *H04B 1/7156* (2013.01); *H04W 4/023* (2013.01); *H04W 4/80* (2018.02); *H04B 2001/71563* (2013.01)

(56) References Cited

U.S. PATENT DOCUMENTS

| | | | | |
|---|---|---|---|---|
| 2013/0201003 | A1* | 8/2013 | Sabesan | G06K 19/0723 340/10.1 |
| 2014/0015546 | A1* | 1/2014 | Frederick | G01S 13/38 324/642 |
| 2014/0184447 | A1* | 7/2014 | Zhou | G01S 13/84 342/127 |
| 2016/0077204 | A1* | 3/2016 | Lee | G01S 7/42 342/126 |
| 2016/0104013 | A1* | 4/2016 | Fessler | G01S 13/84 340/10.1 |
| 2017/0199268 | A1* | 7/2017 | Frederick | G01S 5/0294 |

OTHER PUBLICATIONS

Nikitin et al., "Phase Based Spatial Identification of UHF RFID Tags", IEEE RFID, 2010, pp. 102-109.

* cited by examiner

Phase Unwrapping

Fig. 5 (a) Stationary tag @17ft, before extrapolation (b) Stationary tag @15ft, after extrapolation

COMMUNICATION DEVICE AND A METHOD FOR LOCALIZATION

RELATED APPLICATIONS

The present application is a National Stage Application of International Application No. PCT/US2016/038593 filed on Jun. 22, 2016 and is incorporated herein by reference in its entirety.

TECHNICAL FIELD

Various aspects of this disclosure relate generally to a method and a device for wireless communications.

BACKGROUND

Localization and its based services are an important contextual element for the realization of the Internet of Things (IoT) vision. As the desire of realizing the IoT vision becomes stronger, finding an effective way of connecting trillions of things, identifying the location of objects and people and providing location based services, in a simple and unobtrusive manner, are in high demand. Due to the passive Ultra High Frequency (UHF) Radio Frequency Identification (RFID) properties of lightweight protocol, low power, low cost and long-lifetime, the potential of RFID technology in connecting the trillions of things and tracking their locations can be considered as a revolutionary element to achieve the desired of IoT realization. However, applying the state-of-the-art RFID technology to real world applications represents a great challenge and requires bridging the gap between research and practice. Even though several RFID phase based localization techniques have been proposed in academia, these techniques are impractical to be directly applied to real world data due to inherent radio frequency (RF) characteristics of noise susceptibility and environment change sensitivity and multipath effects. Despite the influence of RF signal sensitivity and multipath effects, the expectation and interest of RFID technology from industry is rapidly growing in many areas including retail and healthcare to provide high quality of service to their customers based on their location and track their assets in real time.

BRIEF DESCRIPTION OF THE DRAWINGS

The disclosure is explained in greater detail below on the basis of an exemplary embodiment, wherein also as before no distinction will be drawn specifically among the claim categories and the features in the context of the independent claims are intended also to be disclosed in other combinations. In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

DETAILED DESCRIPTION

Figure 1:
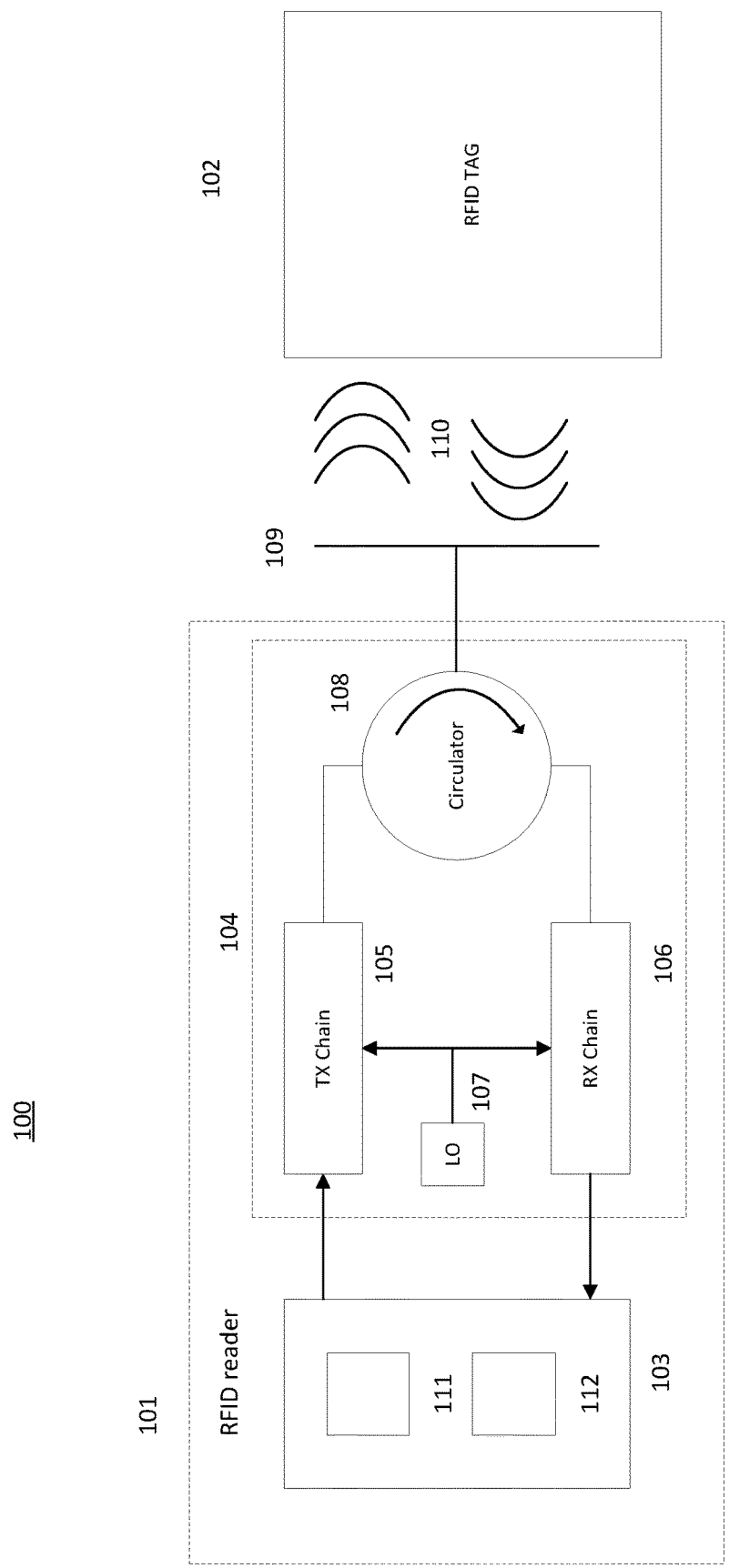
FIG. 1 shows an exemplary RFID communication network including an RFID reader and an RFID tag in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component including one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as W LAN (wireless local area network), Win, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, e.g. in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

FIG. 1 shows an RFID communication network 100 in an aspect of this disclosure. It is appreciated that RFID communication network 100 is exemplary in nature and thus may be simplified for purposes of this explanation. It shall be emphasized that aspects of this disclosure may be applied to other communication networks such as cellular communication networks as well.

RFID communication network 100 may include at least an RFID reader 101 and an RFID tag 102. All communication between RFID reader 101 and RFID tag 102 occurs completely through a wireless link 110 also referred to as air interface. Through a sequence of commands sent and received between both devices (called the inventory round), RFID reader 101 may identify the electronic product code (EPC) of RFID tag 102. For passive tags, RFID reader 101 may operate as an interrogator that initiates an interrogation round with a query command. The query command essentially activates RFID tag 102, which responds with the appropriate information.

Note from FIG. 1 that RFID reader 101 may include a baseband module 103 and an RF module 104. The RF module 104 may include a three-port RF component called a circulator 108 that gives both transmit front end 105 and receive front end 106 the ability to use the same antenna 109. A local oscillator 107 may provide an RF signal to transmit front end 105 and receive front end 106. Timing information between transmit and receive commands may be defined by strict guidelines. In fact, a sort of "handshaking" may be required between RFID tag 102 and RFID reader 101 to complete an interrogation round. On an interrogator, an embedded (micro)processor 111 coupled to memory 112 may be required to decode and generate commands within a tight timing interval. Transmit front end 105, receive front end 106, local oscillator 107 and circulator 108 form a transceiver that may further include a phase measurement unit (not shown) to measure the phase of a tag signal.

RFID tag 102 may be a modulated backscatter UHF MD tag. UHF RFID is a very short range narrowband technology with a typical tag read range on the order of 10-20 ft. For spatial identification, i.e. determination of position and velocity, RF phase information may be used. Specifically, three main techniques based on Phase Difference of Arrival (PDOA) may be applied: TD (Time Domain), FD (Frequency Domain) and SD (Spatial Domain). With any of these techniques the distance between REID reader 101 and RFID tag 102 may be estimated.

Figure 2:
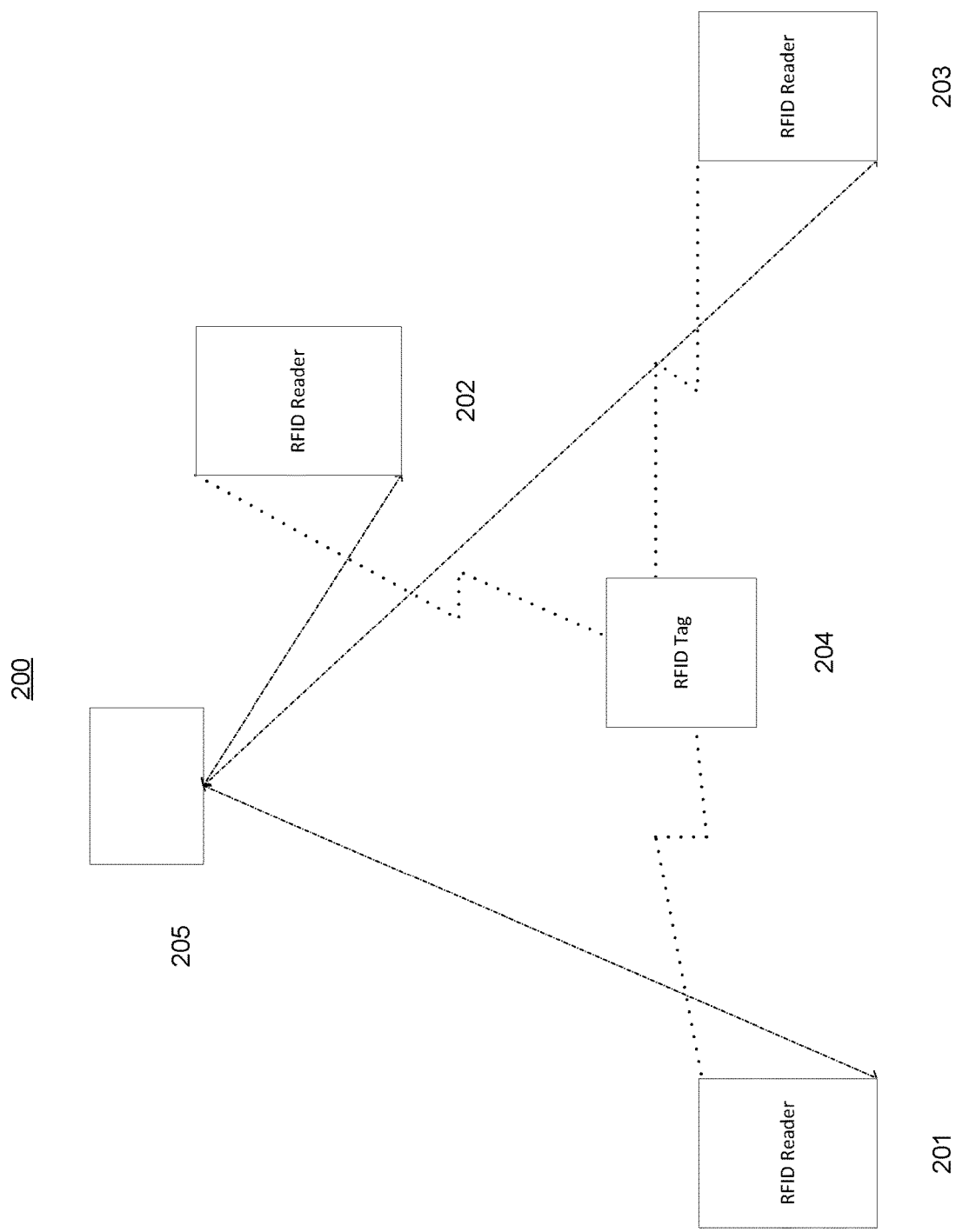
FIG. 2 shows another exemplary RFID communication network in an aspect of this disclosure.

FIG. 2 shows an RFID communication network including three RFID readers 201, 202, 203, each connected to a location determination unit 205 that determines the location of RFID tag 204 based on trilateration. Trilateration allows the determination of the absolute location of RFID tag 204 by measurement of distances from each of the RFID readers 201, 202, 203 to REID tag 204 using a PDOA method. The three distances are communicated to location determination unit 205 which determines the absolute location of MD tag 102 based on trilateration using the three distances.

Now referring back to FIG. 1, the phase of the received tag signal depends both on the wireless link and the modulating characteristics of the tag, which may be both frequency and power dependent. In many cases these factors can be calibrated out if PDOA is used. RFID reader 101 may perform fully coherent detection and measure both the power and the phase of the received tag signal.

In phasor space, i.e. plane of the received baseband voltage, a typical tag signal seen at REID reader 101 describes a linear relationship in time domain. The phase is the angle between the I-axis and the linear relationship. The phase thus describes the slope of the relationship in the I-Q plane. In any propagation environment, the phase of the received tag signal may be denoted by: $\varphi = \varphi_{prop} + \varphi_0 + \varphi_{BS}$, where $\varphi_{prop}$ is the phase accumulated due to the electromagnetic wave propagation, $\varphi_0$ is the phase offset which includes phase of the cables and other RHD reader antenna components, and $\varphi_{BS}$ is the backscatter phase of the tag modulation, see section II "Tag phase" of "Phase Based Spatial Identification of UHF RFID tags" by Pavel V. Nikitin, Rene Martinez. Shashi Ramamurthy, Hunter Leland, Gary Spiess, and K. V. S. Rao, IEEE RFID 2010.

Frequency Domain Phase Difference of Arrival (FD-PDOA) may be employed to estimate the distance between RFID reader 101 and RFID tag 102 by measuring the tag phase at different frequencies and taking the derivative of the phase with respect to frequency, and assuming that phase offset $\varphi_0$ due to RFID reader's transmit/receiver circuits and backscatter phase $\varphi_{BS}$ due to tag reflection characteristics do not change with frequency or can be calibrated out and that the tag has not moved much less than a wavelength during phase measurements by calculating:

$$d = \frac{-c \partial \varphi}{4\pi \partial f}$$

where c denotes the speed of light, φ denotes the phase and f denotes the frequency. The distance may be computed by embedded microprocessor 111 in RFID reader 101. However, this technique may only work well in an anechoic chamber.

Figure 3:
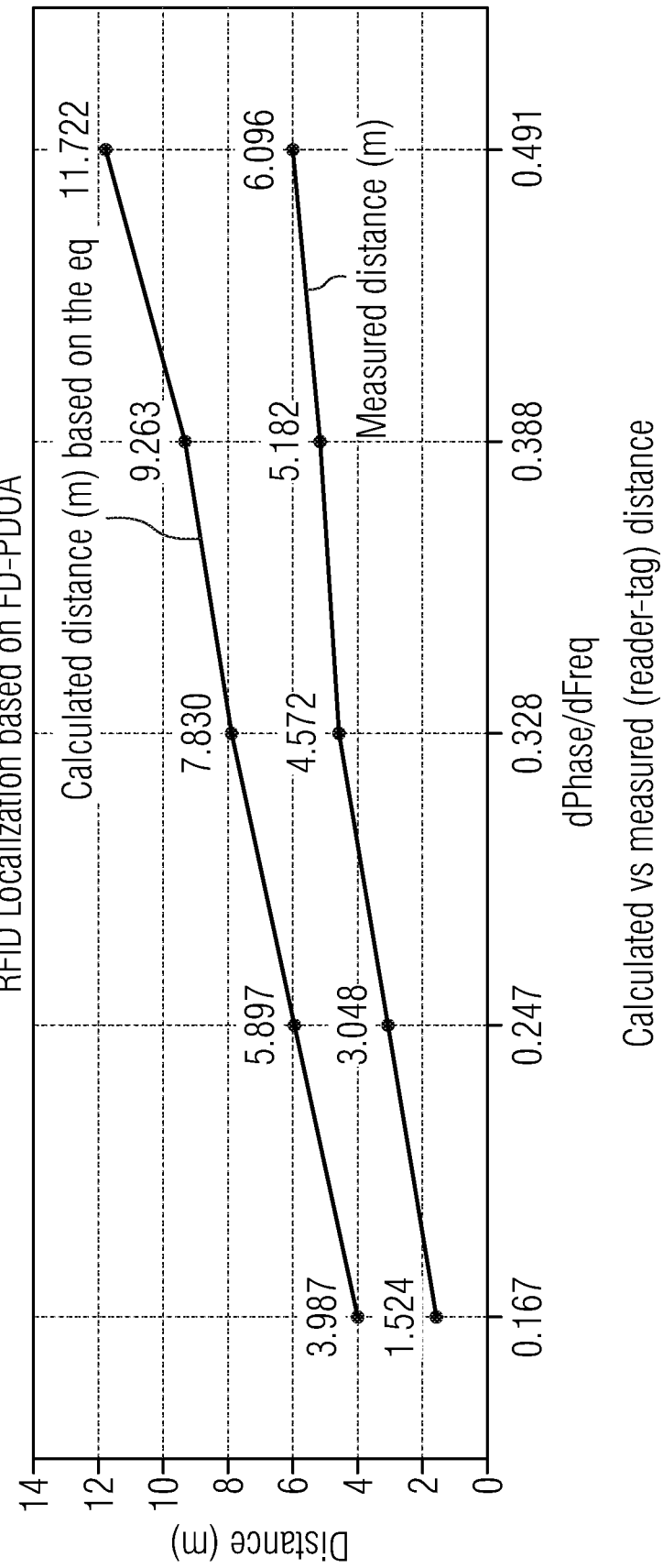
FIG. 3 shows a diagram showing a calculated versus a measured distance between RFID reader and RFID tag for a frequency domain phase difference of arrival method in an aspect of this disclosure.

FIG. 3 shows diagram showing a calculated versus a measured distance between RFID reader 101 and RFID tag 102 for a frequency domain phase difference of arrival method in an aspect of this disclosure. It can be observed that both curves show that the distance is proportional to the derivative of the phase with respect to frequency dφ/df. However, there is large gap between the calculated and measured distance. Moreover, the absolute difference in the distances is not constant. This clearly indicates that directly applying the theoretical FD-PDOA technique may be not suitable for real environments.

A more practically suitable approach for leveraging RFID phase for localization in in a highly multipath environment may include extracting a robust and stable phase signal pattern in a highly multipath environment and using the extracted phase signal pattern itself as a unique signature of a particular physical location. In contrast to the theoretical FD-PDOA technique which uses the absolute values of the phase to calculate the range of the tag, which may not be robust enough in a multipath environment, the extracted phase signal pattern may be used in machine learning, e.g. fingerprinting approach, possibly along with other features such as received signal strength indicator (RSSI), rag read rate and antenna identifier (ID) to estimate the location of RFID tagged items or people.

The proposed approach may also leverage fixed location reference tags and perform pattern matching between the signature of a target tag and the signature from these reference tags at each location on the fly, i.e. withouth training, to estimate the target location.

Now referring back to FIG. 1, RF module 104, specifically receive unit 106, may further include a phase measurement unit (not shown) configured to measure the phase of the tag signal. The phase measurement unit may measure a phase of a first tag signal received from RFID tag 102, the signal having a first frequency and may further measure a phase of a second tag signal received from RFID tag 102; the second tag signal having a second frequency. The BB module 103, specifically embedded processor 111 may determine a phase pattern of a measured phase versus frequency based on the measured phase of the first tag signal and the measured phase of the second tag signal and perform pattern matching of the phase pattern with a reference phase pattern of a plurality of pre-determined reference phase patterns, i.e. by comparing the phase pattern against the reference phase pattern. The BB module 103 may perform pattern matching with each reference phase pattern of a plurality of pre-determined reference phase patterns, i.e. by comparing the phase pattern against each reference phase pattern. Each reference phase pattern may be associated with a distance between RFID reader and RFID tag. The plurality of pre-determined reference phase patterns may be stored to memory 112 comprised in BB module 103. Embedded microprocessor 111 may retrieve each reference phase pattern of the plurality of pre-determined reference phase patterns from memory 112 to perform the comparison. The BB module 103, specifically embedded microprocessor 111, may then determine the distance between RFID reader 101 and RFID tag 102 based on the pattern matching, i.e. the comparison of the phase pattern and the reference phase pattern.

Reference pattern generating may be performed in a supervised learning approach. The absolute values of the measured phase versus frequency may be less relevant for pattern matching, but the curvature information, e.g. the slope may be a relevant pattern matching criteria. Pattern matching algorithms such as cosine similarity are suitable to account for curvature information pattern matching, i.e. slope pattern matching.

Figure 7:
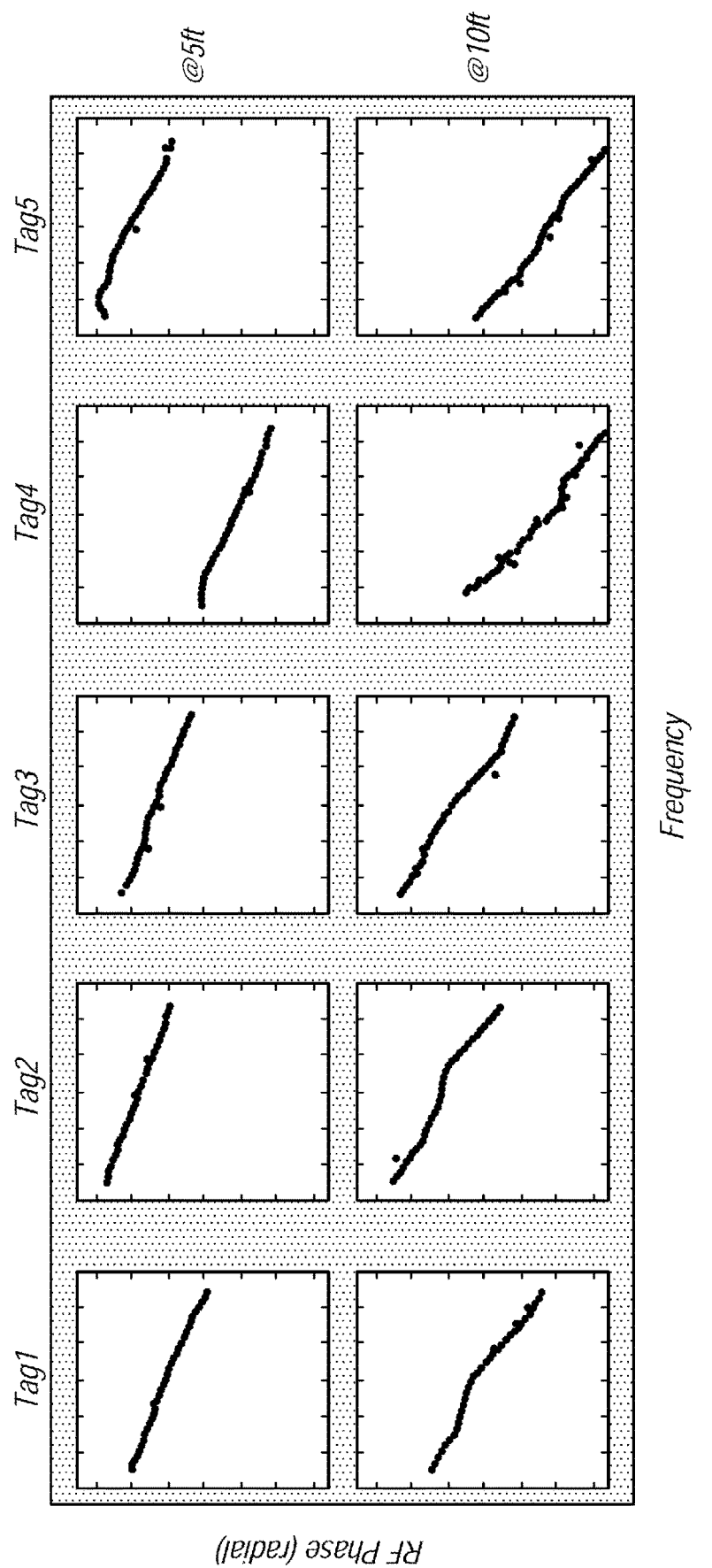
FIG. 7 shows a diagram showing an RF phase versus frequency of a plurality of stationary RFID tags at a distance of 5 ft and at a distance of 10 ft.

FIG. 7 shows a diagram showing a series of phase versus frequency values of a plurality of stationary RFID tags 1-5 at a distance of 5 ft and at a distance of 10 ft. The original series may have been pre-processed by phase unwrapping including extrapolation which will be explained later in more detail. Each of the series exhibits a stable phase pattern. It can be observed that slope of the series at a distance of 5 ft is nearly the same for all RFID tags 1-5 and is shallower than the slope of the series at distance of 10 ft which is also nearly the same for all RFID tags 1-5. Although the values of the phase itself of each of the RFID tags 1-5 is different, the phase pattern is similar in terms of its slope. Tags at similar locations have a similar phase pattern, i.e. nearly the same slope, and the further the RFID tags 1-5 are away from the RFID reader, the steeper the slopes are. Hence, the slope, i.e. the derivative of the phase with respect to frequency is a unique phase signature for determining the distance between RFID reader and RFID tag. Thus, pattern matching may be performed on the phase itself, but then the pattern matching algorithm needs to take into account the curvature information, e.g. the slope. As mentioned above a pattern matching algorithm such as cosine similarity may be employed. Alternatively, pattern matching may be performed on the derivative of the phase with respect to frequency so that the pattern matching algorithms that work on values of the derivative of the phase with respect to frequency itself such as Euclidian distance may be employed.

The series of measured phase versus frequency values may not be steady so that pre-processing may become necessary in order to generate a stable phase pattern. Pre-processing may include distinguishing stationary from non-stationary tags, curve fitting, phase unwrapping and extrapolation of missing frequencies due to burst lost blocks.

Figure 6:
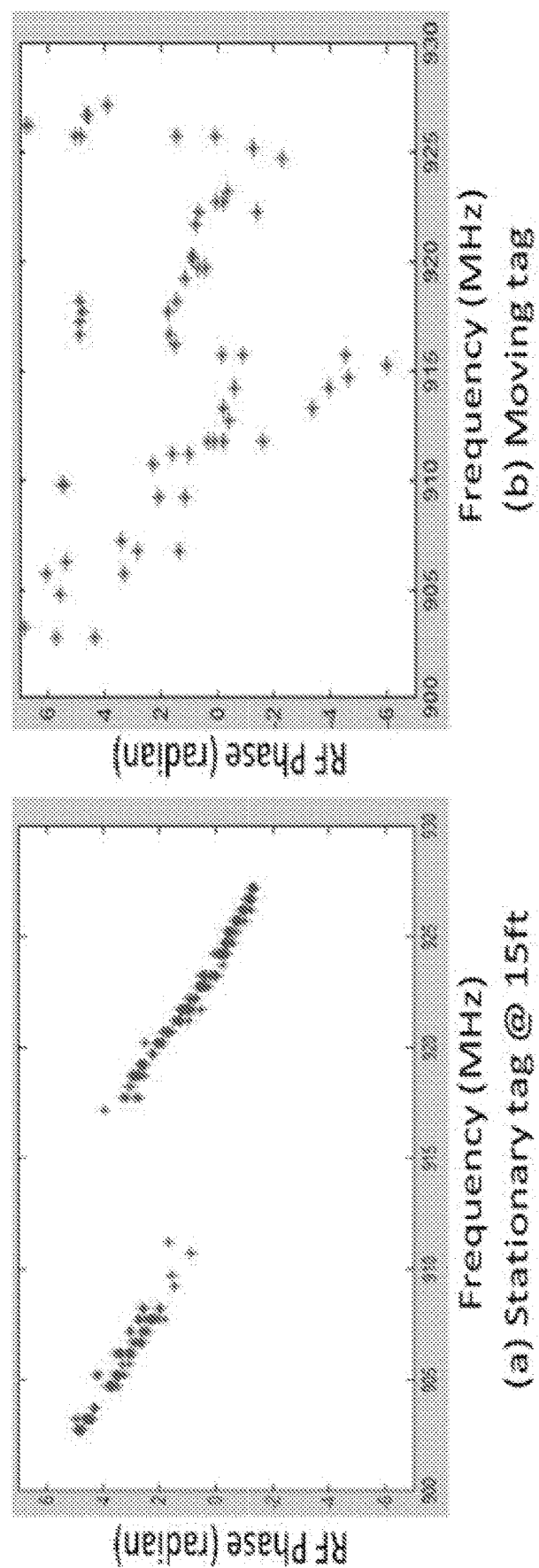
FIG. 6 shows a diagram showing an RF phase versus frequency of a stationary RFID tag versus a moving RFID tag.

FIG. 6a) shows a typical series of phase versus frequency values for a stationary RFID tag. It can be observed that there is block of missing frequencies. Moreover, there appears to be linear relationship between phase and frequency when disregarding the phase jump that occurs after the gap. In contrast, FIG. 6b) shows a typical series of phase versus frequency values for a moving RFID tag. The phase series varies randomly over frequency.

Embedded microprocessor 111 may identify a (functional) relationship between the measured phase and frequency. If a relationship exists, embedded microprocessor 111 may be determine the phase pattern based on the relationship between the measured phase and the frequency. A functional relationship may not exist when the RFID tag 102 is moving as can be observed in FIG. 6b) that shows a series of measured phase versus frequency values in which the phase varies randomly over frequency. In contrast, a functional relationship may exist when RFID tag 102 is stationary as can be observed in FIG. 6a) that shows a series of measured phase versus frequency values exhibiting a linear relationship.

Embedded microprocessor 111 may indentify a (functional) relationship between the measured phase and frequency by estimating a fitting curve of the series of measured phase versus frequency values by any suitable curve fitting technique. Embedded microprocessor 111 may compute an error between the fitting curve and the series of measured phase versus frequency values to determine whether curve fitting has been successful or not. IF the error exceeds a threshold, embedded microprocessor 111 may determine that no relationship between the measured phase and frequency exists. In contrast, when the error is at or below a threshold, embedded microprocessor 111 may determine that a relationship between the measured phase and frequency exists. The error between the fitting curve (not shown) and the series of phase versus frequency values is much smaller in FIG. 6a) where such a relationship exists than in FIG. 6.b) where such relationship does not exist.

Figure 4:
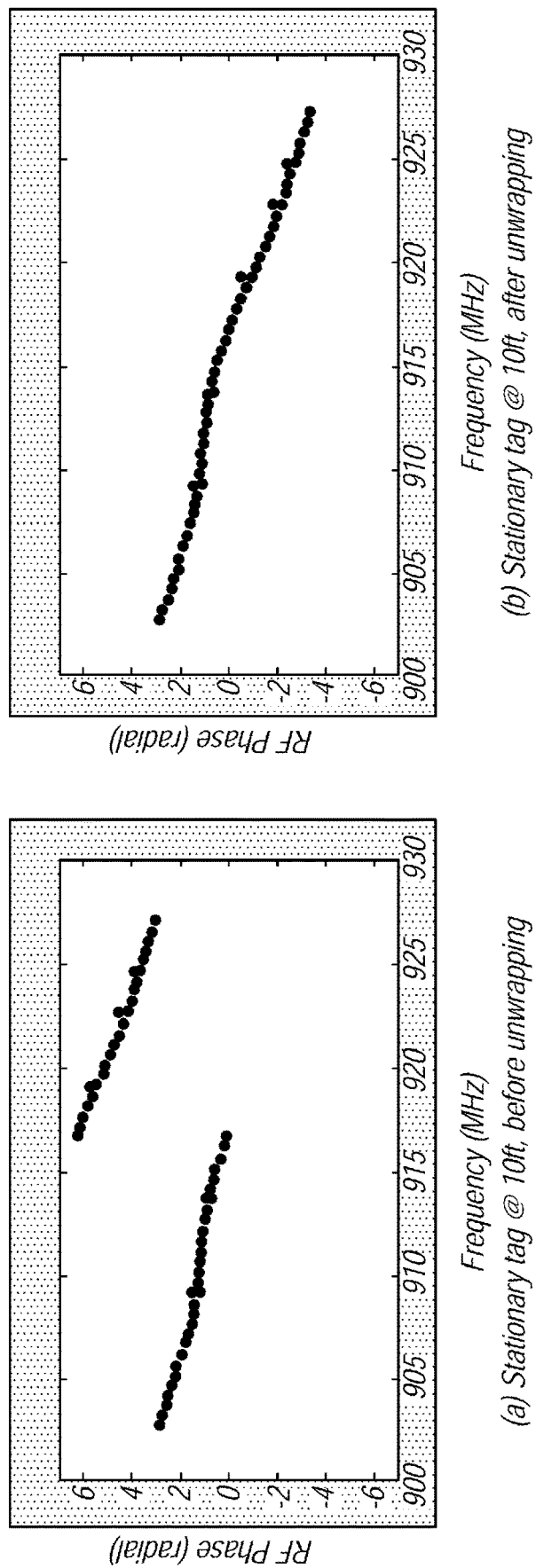
FIG. 4 shows a diagram showing phase unwrapping of a radio frequency (RF) phase versus frequency in an aspect of this disclosure.
Figure 5:
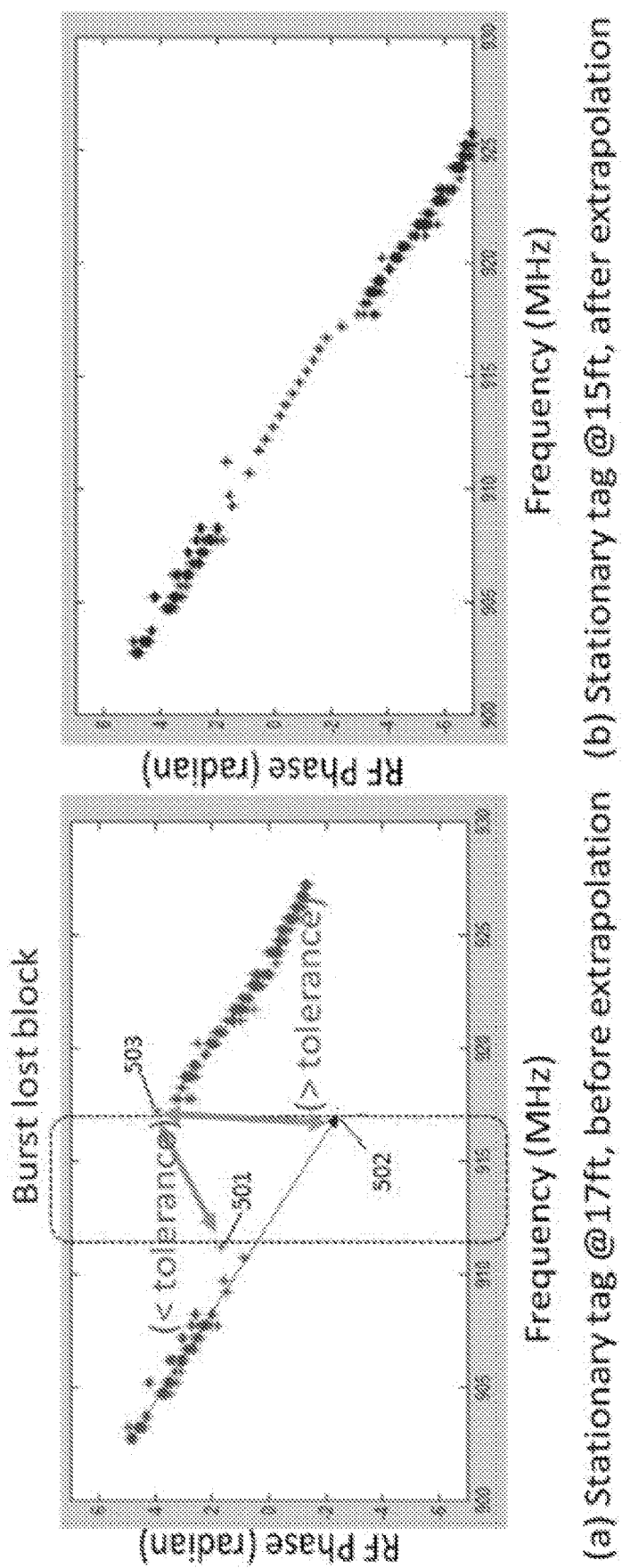
FIG. 5 shows a diagram showing linear extrapolation of an RF phase versus frequency in an aspect of this disclosure.

However, the error between the fitting curve (not shown) and the series of phase versus frequency values may still exceed the threshold, even though a functional relationship between phase and frequency exists as shown in FIG. 6a). The error exceeding the threshold may originate in phase jumps and burst lost blocks in the series of measured phase versus frequency values as will be explained with reference to FIG. 4 and FIG. 5. Hence, eventhough FIG. 6a) refers to a stationary tag, it is clear that the shown phase pattern may not be stable enough for pattern matching to determine the distance between RFID reader 101 and RFID tag 102. Therefore, some further pre-processing to account for phase jumps and burst lost blocks may be required. The further pre-processing may include phase unwrapping and extrapolation to generate a stable phase pattern. From a stable phase pattern phase features based on differentials may be extracted to minimize the RF signal multipath effect.

FIG. 4a) shows the series of measured phase versus frequency values for a stationary tag that exhibits a discontinuity/jump in the phase before phase unwrapping. Embedded microprocessor 111 may reconstruct original phase values by adding multiples of +/−Pi when a phase difference between consecutive values of the series of measured phase versus frequency values exceeds a tolerance. For example, the tolerance may be 1.3 time Pi.

FIG. 4b) shows the series of measured phase versus frequency values after phase unwrapping. The phase turns out to be a near linear function of frequency. The deriviate of the phase with respect to frequency dφ/df is the slope of the near linear function and nearly a constant straight line in this case. However, the series of measured phase versus frequency values after phase unwrapping may not always be a near linear function. Hence, dφ/df may not always be a constant or a constant straight line. In fact, the series of measured phase versus frequency values after phase unwrapping may be a bended curve. Thus, dφ/df may be a linear function or a bended curve. As the technique of the present disclosure may uses the phase pattern, i.e. shape or curvature information, hence implictly or explicitly dφ/df as phase feature rather than the absolute of the phase φ to determine the distance between RFID reader 101 and RFID tag 102, the technique works even well in this extreme case.

FIG. 5a) shows a series of phase versus frequency values with a missing section of phase-frequency values that may be due to a burst lost block, e.g. when RFID tag 102 cannot be detected for a short period of time due to interference from other devices. Phase unwrapping is not applicable in this case. The difference between consecutive phase-frequency value 501 and 503 is less than the tolerance so that phase unwrapping would not be triggered. However, this occurs only because phase-frequency value 502 that truly precedes phase-frequency point 503 is hidden in the burst lost block. The difference between truly consecutive phase frequency values 502 and 503 does exceed the tolerance so that phase unwrapping would be triggered. Therefore, phase-frequency point 502 may need to be determined, e.g. by linear extrapolation.

Embedded microprocessor 111 may perform phase unwrapping that includes applying extrapolation to estimate phase values for missing frequencies of the series of measured phase versus frequency values before determining a phase difference between consecutive values of the series of measured phase versus frequency values. Specifically linear extrapolation may be applied.

Specifically, embedded microprocessor 111 may apply linear extrapolation on the tag signal in the dominant cluster of phase-frequency points. FIG. 4*b*) shows the series of phase versus frequency values after pre-processing that includes linear extrapolation and phase unwrapping. The resulting series exhibits stable phase pattern that can be used for pattern matching.

Moreover, it may be required to compute a stable phase pattern in a reasonable amount of time, e.g. tens of seconds. The phase pattern generation time may be further reduced by providing a frequency hopping sequence in a prearranged manner with a fewer number of channel frequencies. In general, RFID technology uses Frequency-Hopping Spread Spectrum (FHSS) in which the carrier frequency generated by local oscillator 107 hops from channel to channel in some pre-arranged sequence. More precisely, UHF RFID bandwidth in North America ranges from 902 MHz to 928 MHz with 0.5 MHz interval/step that makes a total of 50 channel frequencies. In order to speed up the data acquisition process, embedded microprocessor 111 that controls RF module 104 in RFID reader 101 may be programmed to skip some of the channel frequencies. For example, microprocessor 111 may instruct the RF module 104 to use multiples of 0.5 MHz as an interval to skip some of the channels to speed up data generation. In other words, a range of frequencies bounded by the first frequency and the second frequency may include a number of skipped frequencies of a pre-arranged hopping sequence at which the communication device operates and at which the phase is not measured.

After pre-processing pattern matching may be performed. It may be specifically performed on the fitting curve. In a supervised learning approach, a reference phase pattern needs to be pre-determined that may depend on the actual environment.

Now referring back to FIG. 1, the phase measurement unit (not shown) may be configured to measure the phase of a reference tag signal received from a reference RFID tag. The reference RFID tag is located at a known distance between RFID reader 101 and the reference RFID tag. The phase measurement unit may measure the phase of a first reference tag signal having a first frequency and may further measure a phase of at second reference tag signal; the second reference tag signal having a second frequency. The BB module 103, specifically embedded processor 111 may determine a reference phase pattern of a measured phase versus frequency based on the measured phase of the first reference tag signal and the measured phase of the second reference tag signal. Embedded microprocessor 111 may associate the reference phase pattern with the known distance between RFID reader 101 and the reference tag. The reference phase pattern may be stored to memory 112 comprised in BB module 103.

When determining the distance of RFID tag 102, embedded microprocessor 111 may retrieve the reference phase pattern from memory 112 to perform a comparison with a phase pattern of an RFID tag which distance needs to be determined. The BB module 103, specifically embedded microprocessor 111, may then determine the distance between the RFID reader and the RFID tag based on the pattern matching, i.e. the comparison of the phase pattern and the reference phase pattern.

For the reference phase pattern generation any pre-processing may be applied such as phase unwrapping, extrapolation of missing frequencies in a series of phase versus frequency values and curve fitting. Specifically, the reference phase pattern may be the fitting curve. Also, frequency hopping may be applied in order to save acquisition time.

Alternatively to a supervised learning approach, pattern matching may be performed on the fly without training. In this case reference RFID tags are placed at different locations in the environment. The RFID reader may then compare the phase pattern of a reference RFID tag at a known location with the phase pattern of an RFID tag which location needs to be determined.

Referring again to FIG. 7, RFID tags 1-5 can be distinguished by their phase pattern including information on the phase itself. Even though the slope of the series at a distance of 5 ft is nearly the same for all RFID tags 1-5, the values of the phase itself differs. RFID tags 1-5 may be reference tags and placed at different locations in the environment. Then an RFID tag in the vicinity of a reference RFID tag can be localized by performing pattern matching of the phase pattern of the RFID tag and the phase pattern of the reference RFID tag. Pattern matching algorithms such as cosine similarity, Eucledian distance or iterative closest point (ICP) can be applied between the signature of a target tag and the signature from reference tags at each location on the fly to estimate the target location.

Now referring back to FIG. 1, the phase measurement unit (not shown) in receive unit 106 may be configured to measure the phase of the tag signal and the phase of a reference tag signal. The phase measurement unit may measure a phase of a first tag signal received from RFID tag 102, the first tag signal having a first frequency and may further measure a phase of second tag signal received from RFID tag 102; the second tag signal having a second frequency. The phase measurement unit may measure a phase of a first reference tag signal received from a reference RFID tag, the first reference tag signal having a first frequency and may further measure a phase of a second reference tag signal received from the reference RFID tag; the second reference signal having a second frequency.

The BB module 103, specifically embedded processor 111 may determine a phase pattern of a measured phase versus frequency of the tag signal based on the measured phase of the first tag signal and the measured phase of the second tag signal and may also determine a reference pattern of a measured phase versus frequency of the reference tag signal based on the measured phase of the first reference tag signal and the measured phase of the second reference tag signal. Embedded processor 111 may then perform pattern matching of the phase pattern with the reference pattern and determine the distance between the further communication device and the communication device or the location of the further communication device based on the pattern matching.

Embedded mircoprocessor 111 may determine the distance between RFID reader 101 and RFID tag 102 to be equivalent or equal to the distance between RFID reader 101 and the RFID reference tag (not shown in FIG. 1) when the phase pattern matches the reference phase pattern. Alternatively, embedded mircoprocessor 111 may determine the location of RFID tag 102 to be equivalent or equal to the location of the RFID reference tag (not shown in FIG. 1) when the phase pattern matches the reference phase pattern.

For the phase pattern generation as well as the reference phase pattern generation any pre-processing may be applied such as phase unwrapping, extrapolation of missing frequencies in a series of phase versus frequency values and curve fitting. Specifically, the phase pattern and the reference phase pattern, each may be the fitting curve. Also, frequency hopping may be applied in order to save acquisition time.

As already mentioned, the unique phase pattern signature may be the curvature, i.e. the slope of the phase pattern at each frequency. The slope of the phase pattern at each frequency is of course nothing but the derivative of the series of phase versus frequency values. Therefore, the phase pattern may be the derivative of the series of phase versus frequency values or the derivitive of a fitting curve that fits the series of phase versus frequency values. Possibly, some pre-processing may be required to account for phase jumps and burst lost blocks in the series.

Now referring again to FIG. 1, the phase measurement unit (not shown) may be configured to measure the phase of the tag signal. The phase measurement unit may measure a phase of a first tag signal received from RFID tag 102, the first tag signal having a first frequency and may further measure a phase of second tag signal received from RFID tag 102; the second tag signal having a second frequency. The BB module 103, specifically embedded processor 111 may be configured to determine a derivative of a measured phase with respect to frequency based on the measured phase of the first tag signal and the measured phase of the second tag signal and may compare the derivative against a reference derivative of a plurality of pre-determined reference derivatives of a reference phase with respect to frequency. The reference derivative may be associated with a distance between the terminal and the mobile terminal. The plurality of pre-determined reference deriviatives may be stored to memory 112 comprised in BB module 103. Embedded microprocessor 111 may retrieve each reference of the plurality of pre-determined reference derivatives from memory 112 to perform the comparison. The BB module 103, specifically embedded microprocessor 111, may then determine the distance between the terminal and the mobile terminal based on the comparison of the derivative against each reference derivative.

In other words, BB module 103, specifically embedded processor 111 may be configured to determine a phase pattern of a derivative of a measured phase with respect to frequency and perform pattern matching of the phase pattern of the derivative with a reference phase pattern of a plurality of pre-determined reference phase patterns of derivatives of a reference phase with respect to frequency. The reference phase pattern is associated with a distance between the terminal and the mobile terminal. The plurality of pre-determined reference phase patterns may be stored to memory 112 comprised in BB module 103. Embedded microprocessor 111 may retrieve each reference phase pattern of the plurality of pre-determined reference phase patterns from memory 112 to perform the pattern matching. The BB module 103, specifically embedded microprocessor 111, may then determine the distance between the terminal and the mobile terminal based on the pattern matching.

Embedded microprocessor 111 may identify (functional) relationship between the measured phase and frequency. When a relationship exists, embedded microprocessor 111 may be determine the phase pattern of the derivative based on the relationship between the measured phase and the frequency, e.g. by deriving the found relationship, i.e. the phase, with respect to frequency. A functional relationship may not exist, when RFID tag 102 is moving as can be observed in FIG. 6b) that shows a series of measured phase versus frequency values in which the phase varies randomly over frequency. In contrast, a functional relationship may exist when RFID tag 102 is stationary as can be observed in FIG. 6a) that shows a series of measured phase versus frequency values exhibiting a linear relationship.

Embedded microprocessor 111 may identify a (functional) relationship between the measured phase and frequency by estimating a fitting curve of the series of measured phase versus frequency values by any suitable curve fitting technique. Embedded microprocessor 111 may compute an error between the fitting curve and the series of measured phase versus frequency values to determine whether curve fitting has been successful or not. If the error exceeds a threshold, embedded microprocessor 111 may determine that no relationship between the measured phase and frequency exists. In contrast, if the error is at or below a threshold, embedded microprocessor 111 may determine that a relationship between the measured phase and frequency exists. The error between the fitting curve (not shown) and the series of phase versus frequency values is much smaller in FIG. 6a) where such a relationship exists than in FIG. 6.b) where such a relationship does not exist.

Embedded microprocessor 111 may compute the derivative of the fitting curve with respect to frequency and store the derivative to memory 112 as the phase pattern of the derivative. Any further pre-processing such as phase unwrapping, extrapolation of missing frequencies and frequency hopping may be applied. The same applies to the reference phase pattern of the derivative.

Now referring again to FIG. 1, the phase measurement unit (not shown) may be configured to measure the phase of a reference tag signal received from a reference RFID tag at a known distance between RFID reader 101 and the reference RFID tag. The phase measurement unit may measure the phase of the reference phase signal having a first frequency and may further measure a phase of at least one other reference tag signal; the at least one other signal having a second frequency. The BB module 103, specifically embedded processor 111 may determine a reference phase pattern of the derivative of a measured phase versus frequency based on the measured phase of the reference tag signal and the measured phase of the at least one other reference tag signal and may associate the reference phase pattern of the derivative with the known distance between RFID reader 101 and the reference tag. The reference phase pattern of the derivative may be stored to memory 112 comprised in BB module 103.

Alternatively to a supervised learning approach, pattern matching may be performed on the fly without training. In this case reference RFID tags are placed at different locations in the environment. RFID reader 101 may then compare the phase pattern of each reference RFID tag at a known location with the phase pattern of an RFID tag which location needs to be determined.

Referring again to FIG. 7, the distance of RFID tags 1-5 from the RFID reader can be determined from their phase patterns which resemble in terms of curvature information, i.e. slope. It can be observed that the slope of the series at a distance of 5 ft is nearly the same for all RFID tags 1-5, the values of the phase itself differs. RFID tags 1-5 may be reference tags and placed at different locations in the environment. Then the distance between an RFID tag and an RFID reader can be determined when the distance between a reference RFID tag and the RFID reader is known by performing pattern matching of the phase pattern of the RFID tag and the phase pattern of the reference RFID tag, where the phase pattern may be the curvature information, i.e. the derivative of phase with respect to frequency. Pattern matching algorithms such as Eucledian distance or iterative closest point (ICP) may be applied.

Now referring back to FIG. 1, the phase measurement unit (not shown) in receive unit 106 may be configured to measure the phase of the tag signal and the phase of a reference tag signal. The phase measurement unit may measure a phase of a tag signal received from RFID tag 102, the tag signal having a first frequency and may further measure a phase of at least one other tag signal received from RFID tag 102; the at least one other signal having a second frequency. The phase measurement unit may measure a phase of a reference tag signal received from a reference RFID tag, the reference tag signal having a first frequency and may further measure a phase of at least one other reference tag signal received from the reference RFID tag; the at least one other reference tag signal having a second frequency.

The BB module 103, specifically embedded processor 111 may determine a phase pattern of a derivative of a measured phase versus frequency of the tag signal and may also determine a reference pattern of a deriviative of a measured phase versus frequency of the reference tag signal. Embedded processor 111 may then perform pattern matching of the phase pattern with the reference pattern and determine the distance between RFID reader 101 and RFID tag 102 based on the pattern matching.

Embedded mircoprocessor 111 may determine the distance between RFID reader 101 and RFID tag 102 to be equivalent or equal to the distance between RFID reader 101 and the RFID reference tag (not shown in FIG. 1) when the phase pattern matches the reference phase pattern.

Embedded microprocessor 111 identify a (functional) relationship between the measured phase and frequency of the tag signal as well as the reference tag signal. If a relationship exists, embedded microprocessor 111 may be determine the phase pattern of the derivative based on the relationship between the measured phase and the frequency, e.g. by deriving the found relationship, i.e. the phase, with respect to frequency.

Embedded microprocessor 111 may identify a (functional) relationship between the measured phase and frequency by estimating a fitting curve of the series of measured phase versus frequency values by any suitable curve fitting technique. Embedded microprocessor 111 may compute an error between the fitting curve and the series of measured phase versus frequency values to determine whether curve fitting has been successful or not. If the error exceeds a threshold, embedded microprocessor 111 may determine that no relationship between the measured phase and frequency exists. In contrast, if the error is at or below the threshold, embedded microprocessor 111 may determine that a relationship between the measured phase and frequency exists.

Embedded microprocessor 111 may compute the derivative of the fitting curve with respect to frequency for the tag signal as well as the reference tag signal. Hence, the derivative of the fitting curve of the tag signal represents the phase pattern of the derivative and the derivative of the fitting of the reference tag signal represents the reference phase pattern of the derivative.

Any further pre-processing such as phase unwrapping, extrapolation of missing frequencies and frequency hopping may be applied.

Example 1 includes a method for localizing a device, the method performed in a communication device, the method comprising:
measuring a phase of a first signal received by the communication device from the device, the first signal having a first frequency;
measuring a phase of a second signal received by the communication device from the device; the second signal having a second frequency;
determining a phase pattern of the measured phase of the first signal and a measured phase of the second signal versus frequency;
pattern matching the phase pattern with a reference phase pattern of a plurality of pre-determined reference phase patterns, wherein the reference phase pattern is associated with a distance between the device and the communication device; and
determining the distance between the communication device and the device based on the pattern matching.

Example 2 includes the method according to example 1, wherein pattern matching the phase pattern with the reference phase pattern of the plurality of pre-determined reference phase patterns comprises pattern matching with a derivative of the measured phase with respect to frequency representing a pattern matching feature.

Example 3 includes the method according to example 2, wherein pattern matching comprises cosine similarity, Euclidian distance or iterative closest point.

Example 4 includes the method according to any of examples 1 to 3, wherein determining a phase pattern of a measured phase versus frequency comprises:
identifying a relationship between the measured phase and frequency and if a relationship exists:
determining the phase pattern based on the relationship between the measured phase and the frequency.

Example 5 includes the method according to example 4, wherein identifying a relationship between the measured phase and frequency comprises:
estimating a fitting curve of a series of measured phase versus frequency values; computing an error between the fitting curve and the series of measured phase versus frequency values; and
determining that no relationship exists between the measured phase and frequency if the error exceeds the threshold.

Example 6 includes the method according to example 5 further comprising: determining a stationary device if the error is at or below the threshold.

Example 7 includes the method according to example 5 further comprising: determining a non-stationary device when the error exceeds the threshold.

Example 8 includes the method according to any of examples 5 to 7 wherein estimating a fitting curve of a series of measured phase versus frequency values comprises phase-unwrapping.

Example 9 includes the method according to example 8, wherein phase-unwrapping comprises: adding multiples of +/−Pi when a phase difference between consecutive values of the series of measured phase versus frequency points exceeds a threshold.

Example 10 includes the method according to example 9, wherein the threshold is 1.3 times Pi.

Example 11 includes the method according to example 9, wherein the threshold is Pi.

Example 12 includes the method according to any of examples 8 to 11, wherein phase-unwrapping comprises applying extrapolation to estimate phase values for missing frequencies of the series of measured phase versus frequency values before determining a phase difference between consecutive values of the series of measured phase versus frequency values.

Example 13 includes the method according to example 12, wherein applying extrapolation comprises applying linear extrapolation.

Example 14 includes the method according to any of examples 12 to 13, wherein applying extrapolation comprises applying extrapolation when a number of missing frequencies that have been detected in the series of measured phase versus frequency values exceed a threshold.

Example 15 includes the method according to any of examples 12 to 14, wherein applying extrapolation comprises applying extrapolation when a burst lost block occurs in the series of phase versus frequency values.

Example 16 includes the method according to any of examples 1 to 15 wherein a range of frequencies bounded by the first frequency and the second frequency comprises a number of skipped frequencies of a pre-arranged hopping sequence at which the communication device operates.

Example 17 includes the method according to example 16, wherein a range of frequencies bounded by the first frequency and the second frequency comprises a number of skipped frequencies of a pre-arranged frequency hopping sequence at which the phase is not measured.

Example 18 includes the method according to any of examples 16 to 17, wherein the pre-arranged frequency hopping sequence is a frequency hopping spread spectrum sequence.

Example 19 includes the method according to any of examples 1 to 18, wherein frequencies at which the phase is measured are comprised in an Ultra High Frequency (UHF) band.

Example 20 includes the method according to example 19, wherein the UHF band is reserved for radio frequency identification (RFID).

Example 21 includes the method according to example 20, wherein at least some of subsequent frequencies at which the phase is measured are multiples of 0.5 MHz apart.

Example 22 includes the method according to any of examples 1 to 21, wherein determining the distance between the communication device and the device based on the pattern matching of the phase pattern against a reference phase pattern comprises determining the distance that corresponds to the reference phase pattern that matches the phase pattern best.

Example 23 includes the method according to any of examples 1 to 21, wherein pattern matching comprises further taking any or a combination of the following classification features into account: received signal strength indicator, tag read rate, antenna identifier.

Example 24 includes the method according to any of examples 1 to 23, wherein the device is an RFID tag and the communication device is an RFID reader.

Example 25 includes a method for determining a reference phase pattern associated with a distance between a stationary device and a communication device; in the further communication device:
measuring a phase of a first signal received by a communication device from the stationary device, the signal having a first frequency;
measuring a phase of a second signal received by the communication device from the stationary device; the second signal having a second frequency;
determining a reference phase pattern of a measured phase versus frequency based on the phase of the first signal and the second signal;
determining a distance between the stationary device and the communication device; and associating the reference phase pattern with the distance.

Example 26 includes the method according to example 27, wherein determining a distance between the stationary device and the communication device comprises: measuring the distance between the device and the communication device.

Example 27 includes the method according to any of examples 25 to 26, wherein determining the reference phase pattern comprises determining a relationship between the measured phase and frequency.

Example 28 includes the method according to example 27, wherein determining a relationship between the measured phase and frequency comprises
determining a relationship between the measured phase and frequency by estimating a fitting curve of the series of measured phase versus frequency values; and
determining the reference phase pattern to be the fitting curve.

Example 29 includes the method according to example 28, estimating a fitting curve of a series of measured phase versus frequency values comprises phase-unwrapping.

Example 30 includes the method according to example 29, wherein phase-unwrapping comprises: adding multiples of +/−Pi when a phase difference between consecutive values of the series of measured phase versus frequency values exceeds a threshold.

Example 31 includes the method according to example 30, wherein the threshold is 1.3 times Pi.

Example 32 includes the method according to example 30, wherein the threshold is Pi.

Example 33 includes the method according to any of examples 30 to 32, wherein phase-unwrapping comprises:
applying extrapolation to estimate phase values for missing frequencies of the series of measured phase versus frequency values before determining a phase difference between consecutive values of the series of measured phase versus frequency values.

Example 34 includes the method according to example 33, wherein applying extrapolation comprises applying linear extrapolation.

Example 35 includes the method according to any of examples 26 to 34, wherein a range of frequencies bounded by the first frequency and the second frequency comprises a number of skipped frequencies of a pre-arranged hopping sequence at which the mobile device operates.

Example 36 includes the method according to example 35, wherein a range of frequencies bounded by the first frequency and the second frequency comprises a number of skipped frequencies of a pre-arranged frequency hopping sequence at which the phase is not measured.

Example 37 includes the method according to any of examples 35 to 36, wherein the pre-arranged frequency hopping sequence is a frequency hopping spread spectrum sequence.

Example 38 includes the method according to any of examples 26 to 37, wherein frequencies at which the phase is measured are comprised in an Ultra High Frequency (UHF) band reserved for radio frequency identification (RFID).

Example 39 includes the method according to example 38, wherein at least some of subsequent frequencies at which the phase is measured are multiples of 0.5 MHz apart.

Example 40 includes the method according to any of examples 1 to 39, wherein the device is an RFID tag and the communication device is an RFID reader.

Example 41 includes a method for localizing a device, the method performed in a communication device, the method comprising:

measuring a phase of a first signal received by the communication device from the device, the first signal having a first frequency;

measuring a phase of a second signal received by the communication device from the device; the second signal having a second frequency;

determining a phase pattern of the measured phase of the first signal and the measured phase of the second signal versus frequency;

measuring a phase of a first reference signal received by the communication device from at least one reference device of a known location or distance from the communication device, the first reference signal having a first frequency;

measuring a phase of a second reference signal received by the communication device from the at least one reference device; the second reference signal having a second frequency;

determining a reference phase pattern of the measured phase of the first reference signal and the measured phase of the second reference signal versus frequency;

pattern matching the phase pattern with the reference phase pattern, and determining the distance between the communication device and the device or the location of the device based on the pattern matching.

Example 42 includes the method according to example 41 further comprising:

determining the distance between the communication device and the device to be equivalent to the distance between the communication device and the at least one reference device when the phase pattern matches the reference phase pattern or determining the location of the device to be equivalent to the at least one reference device when the phase pattern matches the reference phase pattern.

Example 43 includes the method according to example 42, wherein determining a phase pattern and the reference phase pattern comprises:

identifying a relationship between the measured phase and frequency and if a relationship exists:

determining the phase pattern and the reference phase based on the found relationship between the measured phase and the frequency.

Example 44 includes the method according to any of examples 42 to 43, wherein identifying a relationship between the measured phase and frequency comprises:

estimating a fitting curve of a series of measured phase versus frequency values;

computing an error between the fitting curve and the series of measured phase versus frequency values; and determining that no relationship between the measured phase and frequency could be found if the error exceeds the threshold.

Example 45 includes the method according to example 44 further comprising:

determining a stationary device if the error is at or below the threshold.

Example 46 includes the method according to example 44 further comprising:

determining a non-stationary target when the error exceeds the threshold.

Example 47 includes the method according to any of examples 44 to 46 wherein estimating a fitting curve of a series of measured phase versus frequency values comprises phase-unwrapping.

Example 48 includes the method according to example 7, wherein phase-unwrapping comprises: adding multiples of +/−Pi when a phase difference between consecutive values of the series of measured phase versus frequency values exceeds a threshold.

Example 49 includes the method according to example 48, wherein the threshold is 1.3 times Pi.

Example 50 includes the method according to example 48, wherein the threshold is Pi.

Example 51 includes the method according to any of examples 47 to 50, wherein phase-unwrapping comprises applying extrapolation to estimate phase values for missing frequencies of the series of measured phase versus frequency values before determining a phase difference between consecutive values of the series of measured phase versus frequency values.

Example 52 includes the method according to example 51, wherein applying extrapolation comprises applying linear extrapolation.

Example 53 includes the method according to any of examples 51 to 52, wherein applying extrapolation comprises applying extrapolation when a number of missing frequencies that have been detected in the series of measured phase versus frequency values exceed a threshold.

Example 54 includes the method according to example 51, wherein applying extrapolation comprises applying extrapolation when a burst lost block occurs in the series of phase versus frequency values.

Example 55 includes the method according to any of examples 41 to 54 wherein a range of frequencies bounded by the first frequency and the second frequency comprises a number of skipped frequencies of a pre-arranged hopping sequence at which the communication device operates.

Example 56 includes the method according to example 55, wherein a range of frequencies bounded by the first frequency and the second frequency comprises a number of skipped frequencies of a pre-arranged frequency hopping sequence at which the phase is not measured.

Example 57 includes the method according to any of examples 55 to 56, wherein the pre-arranged frequency hopping sequence is a frequency hopping spread spectrum sequence.

Example 58 includes the method according to any of examples 41 to 57, wherein frequencies at which the phase is measured are comprised in an Ultra High Frequency (UHF) band reserved for radio frequency identification (RFID).

Example 59 includes the method according to example 58, wherein at least some of subsequent frequencies at which the phase is measured are multiples of 0.5 MHz apart.

Example 60 includes the method according to examples 41 to 59, wherein the device is an RFID tag, the reference device is a reference RFID tag and the further communication device is an RFID reader.

Example 61 includes a method for localizing a device, the method performed in a communication device, the method comprising:

measuring a phase of a first signal received by the communication device from the device, the signal having a first frequency;

measuring a phase of a second signal received by the communication device from the device; the second signal having a second frequency;

determining a phase pattern of a derivative of a measured phase with respect to frequency based on the measured phase of the first signal and the measured phase of the second signal;

pattern matching the phase pattern of the derivative with a reference phase pattern of a plurality of pre-determined reference phase patterns of derivatives of a reference phase with respect to frequency, wherein the reference phase pattern is associated with a distance between the device and the communication device; and determining the distance between the communication device and the device based on the pattern matching.

Example 62 includes the method according to example 61, wherein determining a derivative of the phase with respect to frequency comprises:

identifying a relationship between the measured phase and frequency and if a relationship exists:

determining the phase pattern of the derivative based on the found relationship between the measured phase and the frequency.

Example 63 includes the method according to example 62, wherein determining the phase pattern of the derivative base on the relationship between the measured phase and frequency comprises deriving the relationship with respect to frequency.

Example 64 includes the method according to any of examples 62 to 63, wherein identifying a relationship between the measured phase and frequency comprises:

estimating a fitting curve of a series of measured phase versus frequency values; computing an error between the fitting curve and the series of measured phase versus frequency values; and if the error exceeds a threshold:

determining that no relationship between the measured phase and frequency exists.

Example 65 includes the method according to example 64 further comprising:

determining a stationary device when the error does not exceed the threshold.

Example 66 includes the method according to example 64 further comprising:

determining a non-stationary device when the error exceeds the threshold.

Example 67 includes the method according to any of examples 64 to 66 wherein estimating a fitting curve of a series of measured phase versus frequency values comprises phase-unwrapping.

Example 68 includes the method according to example 67, wherein phase-unwrapping comprises: adding multiples of +/−Pi when a phase difference between consecutive values of the series of measured phase versus frequency values exceeds a threshold.

Example 69 includes the method according to example 68, wherein the threshold is 1.3 times Pi.

Example 70 includes the method according to example 68, wherein the threshold is Pi.

Example 71 includes the method according to any of examples 67 to 70, wherein phase-unwrapping comprises applying extrapolation to estimate phase values for missing frequencies of the series of measured phase versus frequency values before determining a phase difference between consecutive values of the series of measured phase versus frequency values.

Example 72 includes the method according to example 71, wherein applying extrapolation comprises applying linear extrapolation.

Example 73 includes the method according to any of examples 71 to 72, wherein applying extrapolation comprises applying extrapolation when a number of missing frequencies that have been detected in the series of measured phase versus frequency values exceed a threshold.

Example 74 includes the method according to example 71, wherein applying extrapolation comprises applying extrapolation when a burst lost block occurs in the series of phase versus frequency values.

Example 75 includes the method according to any of examples 61 to 74 wherein a range of frequencies bounded by the first frequency and the second frequency comprises a number of skipped frequencies of a pre-arranged hopping sequence at which the communication device operates.

Example 76 includes the method according to example 75, wherein a range of frequencies bounded by the first frequency and the second frequency comprises a number of skipped frequencies of a pre-arranged frequency hopping sequence at which the phase is not measured.

Example 77 includes the method according to any of examples 75 to 76, wherein the pre-arranged frequency hopping sequence is a frequency hopping spread spectrum sequence.

Example 78 includes the method according to any of examples 61 to 77, wherein frequencies at which the phase is measured are comprised in an Ultra High Frequency (UHF) band reserved for radio frequency identification (RFID).

Example 79 includes the method according to example 79, wherein at least some of subsequent frequencies at which the phase is measured are multiples of 0.5 MHz apart.

Example 80 includes the method according to any of examples 61 to 79, wherein the device is an RFID tag and the communication device is an RFID reader.

Example 81 includes the method according to any of examples 61 to 80, wherein the phase pattern of the derivative of the measured phase with respect to frequency is a series of values of the derivative of the measured phase with respect to frequency versus frequency.

Example 82 includes the method according to example 81 further comprising: determining the distance that corresponds to the reference phase pattern that matches the phase pattern best.

Example 83 includes the method according to any of examples 81 to 82, wherein pattern matching comprises any or a combination of: cosine similarity, Euclidian distance and iterative closest point.

Example 84 includes the method according to any of examples 81 to 83, wherein pattern matching comprises further taking any or a combination of the following classification features into account: received signal strength indicator, tag read rate, antenna identifier.

Example 85 includes the method according to any of examples 61 to 84, wherein the device is an RFID tag and the communication device is an RFID reader.

Example 86 includes a method for determining a reference phase pattern of derivative of a measured phase with respect to frequency, wherein the reference phase pattern is associated with a distance between a stationary device and a communication device;

measuring a phase of a first reference signal received by a communication device from the stationary device, the first reference signal having a first frequency;

measuring a phase of a second reference signal received by the communication device from the stationary device; the second reference signal having a second frequency;

determining a reference phase pattern by computing a reference derivative of a measured phase with respect to frequency based on the measured phase of the first reference signal and the measured phase of the second reference signal;
determining a distance between the stationary device and the communication device; and associating the reference phase pattern with the distance.

Example 87 includes the method according to example 87, wherein determining a distance between the stationary device and the communication device comprises: measuring the distance between the stationary device and the communication device.

Example 88 includes the method according to any of examples 86 to 87, wherein computing the reference derivative of the phase with respect to frequency comprises:
determining a series of measured phase versus frequency values;
determining a relationship between the measured phase and frequency by estimating a fitting curve of the series of measured phase versus frequency values; and
determining the reference derivative by deriving the fitting curve with respect to frequency.

Example 89 includes the method according to example 88, estimating a fitting curve of a series of measured phase versus frequency values comprises phase-unwrapping.

Example 90 includes the method according to example 89, wherein phase-unwrapping comprises: adding multiples of +/−Pi when a phase difference between consecutive values of the series of measured phase versus frequency values exceeds a threshold.

Example 91 includes the method according to example 90, wherein the threshold is 1.3 times Pi.

Example 92 includes the method according to example 90, wherein the threshold is Pi.

Example 93 includes the method according to any of examples 90 to 92, wherein phase-unwrapping comprises:
applying extrapolation to estimate phase values for missing frequencies of the series of measured phase versus frequency values before determining a phase difference between consecutive values of the series of measured phase versus frequency values.

Example 94 includes the method according to example 93, wherein applying extrapolation comprises applying linear extrapolation.

Example 95 includes the method according to any of examples 86 to 94, wherein a range of frequencies bounded by the first frequency and the second frequency comprises a number of skipped frequencies of a pre-arranged hopping sequence at which the mobile device operates.

Example 96 includes the method according to example 95, wherein a range of frequencies bounded by the first frequency and the second frequency comprises a number of skipped frequencies of a pre-arranged frequency hopping sequence at which the phase is not measured.

Example 97 includes the method according to any of examples 95 to 96, wherein the pre-arranged frequency hopping sequence is a frequency hopping spread spectrum sequence.

Example 98 includes the method according to any of examples 96 to 97, wherein frequencies at which the phase is measured are comprised in an ultra high frequency (UHF) band.

Example 99 includes the method according to example 98, wherein the UHF band is reserved for radio frequency identification (RFID).

Example 100 includes the method according to example 99, wherein at least some of subsequent frequencies at which the phase is measured are multiples of 0.5 MHz apart.

Example 101 includes a method for localizing a device, the method performed by a communication device, the method comprising:
measuring a phase of a first signal received by a communication device from the device, the signal having a first frequency;
measuring a phase a second signal received by the communication device from the device; the second signal having a second frequency;
determining a phase pattern of a derivative of a measured phase with respect to frequency based on the measured phase of the first signal and the measured phase of the second signal;
measuring a phase of a first reference signal received by the communication device from at least one reference device of a known location or a known distance between the communication device and the reference device, the first reference signal having a first frequency;
measuring a phase of a second reference signal received by the communication device from the at least one reference device; the second reference signal having a second frequency;
determining a reference phase pattern of a derivative of a measured phase with respect to frequency based on the measured phase of the first reference signal and the measured phase of the second reference signal;
pattern matching the phase pattern with the reference phase pattern, and determining the distance between the communication device and the device or the location of the device based on the pattern matching.

Example 102 includes the method according to example 101 further comprising:
determining the distance between the communication device and the device to be equivalent to the distance between the communication device and the at least one reference device if the phase pattern matches the reference phase pattern or
determining the location of the c device to be equivalent to the at least one reference device if the phase pattern matches the reference phase pattern.

Example 103 includes the method according to example 102, wherein determining a phase pattern and the reference phase pattern comprises:
identifying a relationship between the measured phase and frequency and if a relationship exists:
determining the phase pattern and the reference phase based on the relationship between the measured phase and the frequency by deriving the relationship with respect to frequency.

Example 104 includes the method according to any of examples 102 to 103, wherein identifying a relationship between the measured phase and frequency comprises:
estimating a fitting curve of a series of measured phase versus frequency values;
computing an error between the fitting curve and the series of measured phase versus frequency values; and
determining that no relationship between the measured phase and frequency exists if the error exceeds a threshold.

Example 105 includes the method according to example 104 further comprising:
determining a stationary communication device if the error is at or below the threshold.

Example 106 includes the method according to example 104: determining a non-stationary communication device if the error exceeds the threshold.

Example 107 includes the method according to any of examples 104 to 106 wherein estimating a fitting curve of a series of measured phase versus frequency values comprises phase-unwrapping.

Example 108 includes the method according to example 107, wherein phase-unwrapping comprises: adding multiples of +/−Pi when a phase difference between consecutive values of the series of measured phase versus frequency values exceeds a threshold.

Example 109 includes the method according to example 108, wherein the threshold is 1.3 times Pi.

Example 110 includes the method according to example 108, wherein the threshold is Pi.

Example 111 includes the method according to any of examples 107 to 110, wherein phase-unwrapping comprises: applying extrapolation to estimate phase values for missing frequencies of the series of measured phase versus frequency values before determining a phase difference between consecutive values of the series of measured phase versus frequency values.

Example 112 includes the method according to example 111, wherein applying extrapolation comprises applying linear extrapolation.

Example 113 includes the method according to any of examples 111 to 112, wherein applying extrapolation comprises applying extrapolation when a number of missing frequencies that have been detected in the series of measured phase versus frequency values exceed a threshold.

Example 114 includes the method according to example 111, wherein applying extrapolation comprises applying extrapolation when a burst lost block occurs in the series of phase versus frequency values.

Example 115 includes the method according to any of examples 101 to 114 wherein a range of frequencies bounded by the first frequency and the second frequency comprises a number of skipped frequencies of a pre-arranged hopping sequence at which the communication device operates.

Example 116 includes the method according to example 115, wherein a range of frequencies bounded by the first frequency and the second frequency comprises a number of skipped frequencies of a pre-arranged frequency hopping sequence at which the phase is not measured.

Example 117 includes the method according to any of examples 11 to 116, wherein the pre-arranged frequency hopping sequence is a frequency hopping spread spectrum sequence.

Example 118 includes the method according to any of examples 101 to 117, wherein frequencies at which the phase is measured are comprised in an Ultra High Frequency (UHF) band.

Example 119 includes the method according to example 118, wherein the UHF band is reserved for radio frequency identification (RFID).

Example 120 includes the method according to example 119, wherein the device is an RFID tag, the reference device is a reference RFID tag and the communication device is an RFID reader.

Example 121 includes an RFID reader comprising a radio frequency (RF) module and a baseband (BB) module, wherein the RF module is configured to:
measure a phase of a signal received from an RFID tag, the signal having a first frequency;
measure a phase of at least one other signal received from the RFID tag; the at least one other signal having a second frequency; and
wherein the BB module is configured to:
determine a phase pattern of a measured phase versus frequency based on the measured phase of the signal and the measured phase of the at least one other signal;
pattern matching the phase pattern with a reference phase pattern of a plurality of pre-determined reference phase patterns, wherein the reference phase pattern is associated with a distance between RFID tag and RFID reader; and
determine the distance between RFID tag and RFID reader based on the pattern matching.

Example 122 includes the RFID reader according to example 121, wherein the RF module comprises a transceiver configured to receive the signal and the at least one other signal from the RFID tag.

Example 123 includes the RFID reader according to any of examples 121 to 122, wherein the RF module comprises a phase measurement unit configured to measure the phase.

Example 124 includes the RFID reader according to any of examples 121 to 123, wherein the BB module comprises a memory to store the plurality of reference phase pattern.

Example 125 includes the RFID reader, wherein the BB module comprises a microprocessor configured determine a phase pattern of a measured phase versus frequency;
pattern matching the phase pattern with each reference phase pattern of a plurality of pre-determined reference phase patterns, wherein each reference phase pattern is associated with a distance between RFID reader and RFID tag; and
determine the distance between RFID reader and RFID tag based on the pattern matching.

Example 126 includes an RFID reader comprising a radio frequency (RF) module and a baseband (BB) module, wherein the RF module is configured to:
measure a phase of a signal that the RFID reader has received from an RFID tag, the signal having a first frequency;
measure a phase of at least one further signal that the RFID reader has received from the RFID tag; the at least one further signal having a second frequency;
measuring a phase of a reference signal that the RFID reader has received from at least one reference RFID located at a known location or distance from the RFID reader, the signal having a first frequency;
measuring a phase of at least one further reference signal that the RFID reader as received from the at least one reference RFID tag; the at least one further signal having a second frequency;
wherein the BB module is configured to:
determine a phase pattern of a measured phase with respect to frequency based on the measure phase of the signal and the measured phase of the at least one further signal;
determine a reference phase pattern of a measured phase with respect to frequency based on the measured phase of the reference signal and the measured phase of the at least one reference signal;
pattern matching the phase pattern with the reference phase pattern, and determine the distance between the RFID reader and the RFID tag or the location of the RFID tag based on the pattern matching.

Example 127 includes an RFID reader comprising a radio frequency (RF) module and a baseband (BB) module, wherein the RF module is configured to:
measure a phase of a signal that the RFID reader has received from an RFID tag, the signal having a first frequency;
measure a phase of at least one further signal that the RFID reader has received from the RFID tag;
the at least one further signal having a second frequency;

and wherein the BB module is configured to:

determine a phase pattern of a derivative of a measured phase with respect to frequency based on the measured phase of the signal and the measured phase of the at least one further signal;

pattern matching the phase pattern of the derivative with each reference phase pattern of a plurality of pre-determined reference phase pattern of derivatives of a reference phase with respect to frequency, wherein each reference phase pattern is associated with a distance between RFID reader and RFID tag; and determine the distance between RFID reader and RFID tag based on the pattern matching.

Example 128 includes an RFID reader comprising a radio frequency (RF) module and a baseband (BB) module, wherein the RF module is configured to:

measure a phase of a signal that the RFID reader has received from an RFID tag, the signal having a first frequency;

measure a phase of at least one further signal that the RFID reader has received from the RFID tag; the at least one further signal having a second frequency;

measure a phase of a reference signal that the RFID reader has received from at least one reference RFID tag of a known location or distance from the RFID reader, the reference signal having a first frequency;

measure a phase of at least one further reference signal that the RFID reader has received from the at least one reference RFID tag; the at least one further reference signal having a second frequency; and wherein the BB module is configured to:

determine a phase pattern of a derivative of a measured phase with respect to frequency based on the measured phase of the signal and the measured phase of the at least one further signal;

determine a reference phase pattern of a derivative of a measured phase with respect to frequency based on the measured phase of the reference signal and the measured phase of the at least one further reference signal; and pattern matching the phase pattern with the reference phase pattern, and determining the distance between RFID reader and RFID tag or the location of the RFID reader based on the pattern matching.

Example 129 includes a non-transitory computer readable medium with computer readable instructions to cause a processor to execute a method for localizing a device, the method performed in a communication device, the method comprising:

measuring a phase of a first signal received by the communication device from the device, the signal having a first frequency;

measuring a phase of a second signal received by the communication device from the device; the at least one further signal having a second frequency;

determining a phase pattern of the measured phase of the first signal and the measured phase of the second signal versus frequency;

pattern matching the phase pattern with a reference phase pattern of a plurality of pre-determined reference phase patterns, wherein the reference phase pattern is associated with a distance between the device and the communication device; and determining the distance between the communication device and the device based on the pattern matching.

Example 130 includes a non-transitory computer readable medium with computer readable instructions to cause a processor to execute a method for localizing a device, the method performed in a communication device, the method comprising:

measuring a phase of a first signal received by a communication device from the device, the signal having a first frequency;

measuring a phase of a second signal received by the communication device from the device; the second signal having a second frequency;

determining a phase pattern of a measured phase with respect to frequency;

measuring a phase of a signal received by the communication device from at least one reference device of a known location or distance from the communication device, the signal having a first frequency;

measuring a phase of a second signal received by the communication device from the at least one reference device; the second signal having a second frequency;

determining a reference phase pattern of a measured phase with respect to frequency; pattern matching the phase pattern with the reference phase pattern, and determining the distance between the further communication device and the communication device or the location of the communication device based on the pattern matching. It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

It should be noted that one or more of the features of any of the examples above may be combined with any one of the other examples. It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A method for localizing a device, the method performed in a communication device, the method comprising:

measuring a phase of a first signal received by the communication device from the device, the first signal having a first frequency;

measuring a phase of a second signal received by the communication device from the device; the second signal having a second frequency;

determining a phase pattern of the measured phase of the first signal and a measured phase of the second signal versus frequency, including identifying a relationship between the measured phase and frequency by applying extrapolation to estimate phase values for missing frequencies of a series of measure phase versus frequency values before determining a phase difference between consecutive values of a series of measured phase versus frequency values to estimate a fitting curve of the series of measured phase versus frequency values;

pattern matching the phase pattern with a reference phase pattern of a plurality of predetermined reference phase patterns, wherein the reference phase pattern is associated with a distance between the device and the communication device; and determining the distance between the communication device and the device based on the pattern matching.

2. The method according to claim 1, wherein pattern matching the phase pattern with the reference phase pattern of the plurality of predetermined reference phase patterns comprises pattern matching with a derivative of the measured phase with respect to frequency representing a pattern matching feature.

3. The method according to claim 2, wherein pattern matching comprises cosine similarity, Euclidian distance or iterative closest point.

4. The method according to claim 1, wherein determining a phase pattern of a measured phase versus frequency further comprises:

determining the phase pattern based on the relationship between the measured phase and the frequency.

5. The method according to claim 1, wherein identifying a relationship between the measured phase and frequency further comprises:

computing an error between the fitting curve and the series of measured phase versus frequency values; and determining that no relationship exists between the measured phase and frequency if the error exceeds a threshold.

6. The method according to claim 5 further comprising:
determining a stationary device if the error is at or below the threshold.

7. The method according to claim 5 further comprising:
determining a non-stationary device when the error exceeds the threshold.

8. The method according to claim 1, wherein phase-unwrapping comprises: adding multiples of +/−Pi when a phase difference between consecutive values of the series of measured phase versus frequency points exceeds a threshold.

9. The method according to claim 8, wherein the threshold is 1.3 times Pi.

10. The method according to claim 8, wherein the threshold is Pi.

11. The method according to claim 1, wherein applying extrapolation comprises applying linear extrapolation.

12. The method according to claim 1, wherein applying extrapolation comprises applying extrapolation when a number of missing frequencies that have been detected in the series of measured phase versus frequency values exceed a threshold.

13. The method according to claim 1, wherein applying extrapolation comprises applying extrapolation when a burst lost block occurs in the series of phase versus frequency values.

14. The method according to claim 1 wherein a range of frequencies bounded by the first frequency and the second frequency comprises a number of skipped frequencies of a pre-arranged hopping sequence at which the communication device operates.

15. The method according to claim 14, wherein a range of frequencies bounded by the first frequency and the second frequency comprises a number of skipped frequencies of a pre-arranged frequency hopping sequence at which the phase is not measured.

16. The method according to claim 14, wherein the pre-arranged frequency hopping sequence is a frequency hopping spread spectrum sequence.

17. The method according to claim 1, wherein frequencies at which the phase is measured are comprised in an Ultra High Frequency (UHF) band.

18. The method according to claim 17, wherein the UHF band is reserved for radio frequency identification (RFID).

19. The method according to claim 18, wherein at least some of subsequent frequencies at which the phase is measured are multiples of 0.5 MHz apart.

20. The method according to claim 1, wherein determining the distance between the communication device and the device based on the pattern matching of the phase pattern against a reference phase pattern comprises determining the distance that corresponds to the reference phase pattern that matches the phase pattern best.

21. The method according to claim 1, wherein the device is an RFID tag and the communication device is an RFID reader.

22. An RFID reader comprising a radio frequency (RF) module and a baseband (BB) module, wherein the RF module is configured to:

measure a phase of a signal received from an RFID tag, the signal having a first frequency;

measure a phase of at least one other signal received from the RFID tag;

the at least one other signal having a second frequency; and wherein the BB module is configured to:

determine a phase pattern of a measured phase versus frequency based on the measured phase of the signal and the measured phase of the at least one other signal including identifying a relationship between the measured phase and frequency by applying extrapolation to estimate phase values for missing frequencies of a series of measure phase versus frequency values before determining a phase difference between consecutive values of a series of measured phase versus frequency values to estimate a fitting curve of the series of measured phase versus frequency values;

pattern matching the phase pattern with a reference phase pattern of a plurality of pre-determined reference phase patterns, wherein the reference phase pattern is associated with a distance between RFID tag and RFID reader; and determine the distance between RFID tag and RFID reader based on the pattern matching.

23. A method for localizing a device, the method performed in a communication device, the method comprising:

measuring a phase of a first signal received by the communication device from the device, the first signal having a first frequency;

measuring a phase of a second signal received by the communication device from the device; the second signal having a second frequency;

determining a phase pattern of the measured phase of the first signal and the measured phase of the second signal versus frequency;

measuring a phase of a first reference signal received by the communication device from at least one reference device of a known location or distance from the communication device, the first reference signal having a first frequency;

measuring a phase of a second reference signal received by the communication device from the at least one reference device; the second reference signal having a second frequency;

determining a reference phase pattern of the measured phase of the first reference signal and the measured phase of the second reference signal versus frequency including identifying a relationship between the measured phase and frequency by applying extrapolation to estimate phase values for missing frequencies of a series of measure phase versus frequency values before determining a phase difference between consecutive values of a series of measured phase versus frequency values to estimate a fitting curve of the series of measured phase versus frequency values; and pattern matching the phase pattern with the reference phase pattern, and determining the distance between the communication device and the device or the location of the device based on the pattern matching.

24. The method according to claim 23, wherein determining a phase pattern of a measured phase versus frequency comprises:

determining the phase pattern based on the relationship between the measured phase and the frequency.

25. The method according to claim 24, wherein identifying a relationship between the measured phase and frequency comprises:

computing an error between the fitting curve and the series of measured phase versus frequency values; and determining that no relationship exists between the measured phase and frequency if the error exceeds a threshold.

\* \* \* \* \*